US012661905B2

(12) United States Patent
Jiang et al.

(10) Patent No.: US 12,661,905 B2
(45) Date of Patent: Jun. 23, 2026

(54) AUTOMATIC PRODUCTION DEVICE FOR LABEL-FREE PACKAGING BOTTLES AND LABELING METHOD THEREOF

(71) Applicant: Shanghai Onlytec Equipment Co., Ltd., Shanghai (CN)

(72) Inventors: Defu Jiang, Shanghai (CN); Yaofei Wang, Shanghai (CN); Wenliang Zeng, Shanghai (CN); Xiuchen Shi, Shanghai (CN)

(73) Assignee: Shanghai Onlytec Equipment Co., Ltd., Shanghai (CN)

( * ) Notice: Subject to any disclaimer, the term of this patent is extended or adjusted under 35 U.S.C. 154(b) by 200 days.

(21) Appl. No.: 18/764,608

(22) Filed: Jul. 5, 2024

(65) Prior Publication Data

US 2025/0100295 A1 Mar. 27, 2025

(30) Foreign Application Priority Data

Sep. 22, 2023 (CN) ......................... 202311230802.7

(51) Int. Cl.
*B41J 3/407* (2006.01)
*B41J 2/455* (2006.01)
(Continued)

(52) U.S. Cl.
CPC ........... *B41J 3/40733* (2020.08); *B41J 2/455* (2013.01); *B41J 3/40731* (2020.08);
(Continued)

(58) Field of Classification Search
CPC .... B41J 2/455; B41J 3/40733; B41J 3/40731; B41J 3/110095; B41J 13/08; B41J 13/103;
(Continued)

(56) References Cited

FOREIGN PATENT DOCUMENTS

| | | | | | |
|---|---|---|---|---|---|
| CN | 108454240 A | * | 8/2018 | ............. | B41J 3/407 |
| CN | 208467517 U | * | 2/2019 | | |
| CN | 214029549 U | * | 8/2021 | | |

* cited by examiner

*Primary Examiner* — Christopher E Mahoney
*Assistant Examiner* — Marissa Ferguson-Samreth
(74) *Attorney, Agent, or Firm* — OPENPTO US LLC; Yuhao Liang

(57) ABSTRACT

The present application relates to an automatic production equipment for label-free packaging bottles, which belongs to the technical field of packaging bottle production. The equipment comprises a machine frame, wherein a bottle body conveying device and a bottle body labeling device are arranged on the machine frame, wherein the bottle body labeling device comprises a rotating shaft arranged on the machine frame and an driving annular plate coaxially fixed on the rotating shaft, a driving mechanism for driving the rotating shaft to rotate is arranged on the machine frame, a plurality of storage plates are rotatably arranged on a top portion of the driving annular plate, the plurality of storage plates are distributed in a circular array along a circumferential direction of the driving annular plate, at least one self-rotating motor for driving each of the plurality of storage plates to rotate is arranged at a bottom portion of the driving annular plate, a servo annular plate is coaxially fixed on the rotating shaft, pressing assemblies corresponding to the storage plates are arranged on the servo annular plate, a plurality of laser heads for bottle labeling are arranged on the machine frame. The present invention is conducive to meeting the labeling requirements of large breadth and high production capacity for packaging bottles, is conducive to the mass production of the label-free packaging bottles, and is conducive to environmental recycling, energy consumption saving, and production cost reduction.

6 Claims, 9 Drawing Sheets

(51) Int. Cl.

| | |
|---|---|
| ***B41J 11/00*** | (2006.01) |
| ***B41J 13/08*** | (2006.01) |
| ***B41J 13/10*** | (2006.01) |
| ***B41M 5/00*** | (2006.01) |

(52) U.S. Cl.

CPC ........... *B41J 11/0095* (2013.01); *B41J 13/08* (2013.01); *B41J 13/103* (2013.01); *B41J 13/106* (2013.01); *B41M 5/0064* (2013.01); *B41M 5/0082* (2013.01)

(58) Field of Classification Search

CPC ... B41J 13/106; B41M 5/0064; B41M 5/0082

See application file for complete search history.

AUTOMATIC PRODUCTION DEVICE FOR LABEL-FREE PACKAGING BOTTLES AND LABELING METHOD THEREOF

INCORPORATION BY REFERENCE

This application claims the benefit of priority from China Patent Application No. 2023112308027 filed on Sep. 22, 2023, the contents of which are hereby incorporated by reference in their entirety.

TECHNICAL FIELD

The present application relates to the field of packaging bottle production, and in particular to an automatic production device for label-free packaging bottles and a labeling method thereof.

BACKGROUND ART

At present, the middle portions of the existing packaging bottles always have adhesive and heat-shrinkable labels (with numbers, characters, LOGO, name, QR code, barcode, DM code, information logo, etc.) thereon, and the packaging bottles will be recycled after use, but at present the labels on the packaging bottles shall be removed when recycling, which wastes a lot of manpower and material resources. However, after removing some labels, the label adhesive will remain on the bottle body, which is inconvenient to handle and reduces the energy-saving and environmental protection value.

In order to meet the development concept of carbon reduction and environmental protection, the concept of "label-free PET bottle" has emerged in the past two years, namely, the bottle body is no longer posted with a label with brand logo and product-related information, but laser printing technology is utilized to label the bottle body. Removing the label can not only reduce the utilization of plastics in the production process, but also reduce the recycling process while simplifying the recycling materials. However, for the existing label-free PET bottles, the bottle body can only be marked with a small amount of content by a laser machine, and the complete product information can only be marked on the outer packaging box, and the complete product information can only be marked on the outer packaging box. As such it is unable to advertise on a single bottle and the sales channel is therefore limited, which cannot meet the production requirements of large breadth and high production capacity.

SUMMARY OF THE INVENTION

In order to achieve large-breadth and high-capacity labeling of packaging bottles, the present invention provides an automatic production equipment for label-free packaging bottles and a labeling method thereof.

In the first aspect, the present invention provides an automatic production device for label-free packaging bottles, which adopts the following technical solutions:

An automatic production equipment for label-free packaging bottles, comprising a machine frame, wherein a bottle body conveying device and a bottle body labeling device are arranged on the machine frame, wherein the bottle body conveying device is arranged on one side of the bottle body labeling device and is in transmission connection with the bottle body labeling device, the bottle body labeling device comprises a rotating shaft arranged on the machine frame and an driving annular plate coaxially fixed on the rotating shaft, a driving mechanism for driving the rotating shaft to rotate is arranged on the machine frame, a plurality of storage plates are rotatably arranged on a top portion of the driving annular plate, the plurality of storage plates are distributed in a circular array along a circumferential direction of the driving annular plate, at least one self-rotating motor for driving each of the plurality of storage plates to rotate is arranged at a bottom portion of the driving annular plate, a servo annular plate is coaxially fixed on the rotating shaft, pressing assemblies corresponding to the storage plates are arranged on the servo annular plate, a plurality of laser heads for bottle labeling are arranged on the machine frame, and the plurality of laser heads are distributed in a fan ring shape on one side of the driving annular plate away from the bottle body conveying device.

By adopting the above technical solution, when labeling the bottle bodies, the bottle body conveying device is sequentially utilized to convey the bottle body to the driving annular plate. At the same time, the driving mechanism drives the driving annular plate to rotate, so as to drive the storage plates to revolve around the rotating shaft, as such each of the storage plates sequentially receives the conveyed bottle bodies. When the bottle bodies arrive at the corresponding storage plates 321, the corresponding pressing assemblies 34 presses down to load the bottle bodies on the storage plates 321. During the rotation of the driving annular plate 32 therewith, the bottle bodies sequentially rotate to the front of the plurality of laser heads, and the product information content to be labeled on the bottle bodies is pre-divided into multiple printing modules, and the divided printing modules are allocated to the corresponding laser heads according to the printing order. When the bottle bodies move to each of the laser heads, each of the laser heads completes its own printing task, and when the arc printing positions on the bottle bodies require to be changed, the storage plates can be driven by the at least one self-rotating motor to rotate to complete the deflection of the arc printing positions on the side walls of the bottle bodies. When all the bottle bodies are labeled, the bottle bodies are sequentially conveyed out of the driving annular plate by the bottle body conveying device to complete the discharge. The plurality of laser heads are utilized to sequentially and continuously perform laser marking on the bottle body through the division of the printing range to achieve large-breadth and high-capacity labeling of label-free packaging bottles, which is conducive to the mass production of the label-free packaging bottles.

Alternatively, the bottle body conveying device comprises a conveying line, a feed driver plate and a discharge driver plate that are arranged on the machine frame, the feed driver plate and the discharge driver plate are respectively rotatably connected with the machine frame are arranged between the conveying line and the driving annular plate, the driving mechanism is in transmission connection with the feed driver plate and the discharge driver plate, a guide plate is arranged above the conveying line and the driving annular plate, the guide plate is arranged between the feed driver plate and the discharge driver plate, an inlet guide notch coaxially arranged with the feed driver plate is arranged on one side of the guide plate, an outlet guide notch coaxially arranged with the discharge driver plate is arranged on the other side thereof, a feed track and a discharge track are respectively arranged on both sides of the guide plate on the conveying line, the feed track is connected with the inlet guide notch, and the discharge track is connected with the outlet guide notch.

By adopting the above technical solution, the conveying line can realize the conveying of the packaging bottle bodies. The packaging bottle bodies first enter the feed track through the conveying line, and at the same time, the driving mechanism drives the feed driver plate to rotate. Through the feed driver plate and the inlet guide notch arranged on the guide plate, the packaging bottle bodies on the output terminal of the feed track can be sequentially transferred to the storage plates of the driving annular plate; after completing labeling all the contents on the packaging bottle bodies, they move toward the discharge driver plate, the driving mechanism drives the discharge driver plate to rotate at the same time. Through the feed driver plate and the outlet guide notch on the guide plate, the packaging bottle bodies on the driving annular plate can be sequentially transferred to the discharge track to achieve sequential discharge. The feeding and discharging of the packaging bottle bodies share one conveying line, which reduces energy consumption while reducing maintenance costs at the same time. The feed driver plate, the discharge driver plate and the guide plate together play the role of a bridge between the conveying line and the driving annular plate, which is conducive to the automatic feeding and discharging of the packaging bottle bodies on the annular running track of the driving annular plate.

Alternatively, the driving mechanism comprises a driving motor arranged on the machine frame and a driving gear arranged on an output terminal of the driving motor, a transmission gear ring is coaxially fixed on the rotating shaft, a first transmission gear is coaxially fixed on the feed driver plate, and a second transmission gear is coaxially fixed on the discharge driver plate, and the transmission gear ring is arranged to engage with the driving gear, the first transmission gear and the second transmission gear.

By adopting the above technical solution, when the driving motor rotates, it drives the driving gear to rotate, the driving gear rotates to drive the transmission gear ring to rotate, and the transmission gear ring rotates to drive the rotating shaft to rotate, so as to achieve the purpose of driving the driving annular plate to rotate; at the same time, the driving gear rotates to drive the transmission gear ring to rotate, and the transmission gear ring rotates to drive the first transmission gear and the second transmission gear to rotate, so as to achieve the purpose of driving the feed driver plate and the discharge driver plate to rotate. By utilizing a driving motor as the driving source for driving the rotating shaft, the feed driver plate and the discharge driver plate to rotate, the number of motors utilized can be reduced, which is conducive to reducing energy consumption and performing synchronous control of the feeding and discharging of the packaging bottle bodies on the driving annular plate.

Alternatively, the feed track comprises feed frames arranged on both sides above the conveying line, a curved buffer channel adapted to an outer diameter of the bottle body is formed between the two feed frames, and the curved buffer channel smoothly transitions with the inlet guide notch.

By adopting the above technical solution, when the packaging bottle bodies are conveyed between the two feed frames, the feeding speed of the packaging bottle bodies is buffered and slowed down through the curved buffer channel, which can reduce the collision impact generated when the packaging bottles touch the feed driver plate, and reduce the possibility of damage or pitting of the packaging bottle bodies. In addition, it can reduce the situation where two or more bottle bodies simultaneously break into one of the dial grooves during the rotation of the feed driver plate due to the excessively fast bottle feeding speed, and then the multiple bottle bodies that enter are forcibly squeezed and damaged by the rotation of the feed driver plate, which reduces the possibility of bottle jamming, blockage, etc.

Alternatively, a material distribution driver plate is rotatably connected with the one of the feed frames on one side, a plurality of material distribution clamping grooves each arranged to permit passage for only a single bottle body to pass through are evenly arranged on an outer peripheral surface of the material distribution driver plate, and a distance from an outermost end of each of the material distribution clamping grooves to a rotation center of the material distribution driver plate is greater than a shortest distance from the rotation center of the material distribution driver plate to the curved buffer channel.

By adopting the above technical solution, the bottle bodies passing through the curved buffer channel can be separated one by one by the material distribution driver plate of the material distribution driver plate first, so that adjacent bottle bodies maintain a certain distance, and then the bottle bodies are fed to the feed driver plate driven by the conveying line, which reduces the situation that one of the dial grooves on the feed driver plate enters two or more bottle bodies at the same time, which further reduces the possibility of bottle jamming.

Alternatively, a detection frame is arranged on the conveying line, the detection frame is arranged on one side of a feeding end of one of the feed frames, a material detection sensor for detecting whether there is a bottle body passing below is arranged on the detection frame, a control cylinder is arranged below the material distribution driver plate, the control cylinder is electrically connected with the material detection sensor, a lifting rod is arranged on an output terminal of the control cylinder, a plurality of limit synapses are arranged on a lower end of the material distribution driver plate, the plurality of limit synapses are distributed in a circular array along a rotation center of the material distribution driver plate, and the lifting rod is arranged on a circular track surrounded by the plurality of limit synapses.

By adopting the above technical solution, when the bottle bodies pass through the curved buffer channel, the centrifugal force on the bottle bodies changes during the movement, which causes the combined force of the own gravity and the centrifugal force of the bottle bodies to change during the movement, which further causes the bottle bodies to shake greatly in the curved buffer channel. Especially when the bottle bodies pass through an inflection point of the curved buffer channel, the change in the centrifugal force of the bottle bodies is the largest, that the bottle bodies are prone to tipping over under the sudden change of centrifugal force. When the bottle bodies are fed from the conveying line, the adjacent bottle bodies are closely adjacent, and the adjacent bottle bodies can support each other during the movement, which can reduce the amplitude of the bottle shaking. In the initial stage of feeding, the lifting rod is in a low position, the conveying line is started, and the initial speed of the conveying line is low, that the bottle bodies are not easy to tip over when passing through the curved buffer channel. After a short period of feeding, the speed of the conveying line gradually reaches a rated speed, and the material detection sensor detects whether there are bottle bodies passing below, and when the material detection sensor detects that the bottle bodies pass below, the control cylinder controls the lifting rod to always remain in a low position, and when the material detection sensor detects that no bottle body passes below, it sends an electrical signal. After receiving the electrical signal, the control cylinder controls the lifting rod to rise to a high position, and at this time, the lifting rod interferes with the circular motion of the limit synapses, which limits the rotation of the material distribution driver plate, and further prevents the bottle bodies from passing through the discharge ends of the feed frames. In this way, the number of the detected bottle bodies between the material distribution driver plate and the material detection sensor can be maintained at a certain value, which is a safe material level value for passing through the curved buffer channel. When the number of bottle bodies behind the target bottle body is less than the safe material level value, the material distribution driver plate blocks the target bottle body from passing through, which can reduce the possibility of the bottle bodies behind the target bottle body tipping over when passing through the curved buffer channel. The blocked target bottle body and the bottle bodies behind are hold for the next batch of production and are labeled together with the next batch of bottle bodies, which ensures the stability of the bottle bodies when passing through the curved buffer channel and ensures smooth feeding of the bottle bodies.

Alternatively, a guide spherical surface is arranged on a bottom end of each of the limit synapses, and guide conical surface is arranged on a top end of the lifting rod.

By adopting the above technical solution, since the positions of the limit synapses are difficult to determine when the lifting rod moves upward, there is a possibility that the lifting rod will collide with one of the limit synapses. By arranging the guide spherical surface and the guide conical surface, when the lifting rod is rising, the guide spherical surface contacts the guide conical surface, and the guide effect of the guide conical surface forces the limit synapses to deflect to one side of the lifting rod, which reduces the collision and extrusion between the lifting rod and the limit synapses when the control cylinder controls the lifting rod to rise to a high position, and reduces the possibility of breakdown of the material distribution driver plate.

Alternatively, each of the limit synapses comprises a fixed portion and a movable portion that are arranged from top to bottom, the fixed portion is fixed to a bottom surface of a material distribution driver plate, the guide spherical surface is arranged at a bottom end of the movable portion, and a buffer spring is connected between the movable portion and the fixed portion.

By adopting the above technical solution, the problem that the limit synapses cannot automatically avoid the lifting rod by means of the guiding effect of the guide conical surface and the guide spherical surface when the cone top of the guide conical surface and the lowest point of the guide spherical surface are in direct contact during the lifting rod rising process can be solved. When the above problem occurs, through arrangement of the movable portion and the buffer spring, when the cone top of the guide conical surface and the lowest point of the guide spherical surface are in direct contact, the buffer spring is compressed, which can buffer the collision of the lifting rod, and at the same time, since the rotation of the material distribution driver plate is not limited, the bottle bodies will still drive the material distribution driver plate to deflect a certain angle when passing through the material distribution driver plate. During the deflection of the material distribution driver plate, the fixed portion deflects accordingly, and the buffer spring is twisted to separate the movable portion from the lifting rod and realize the automatic reset of the movable portion, which realizes the automatic avoidance of the limit synapses to the lifting rod, and further reduces the possibility of collision and extrusion between the lifting rod and the limit synapses when the control cylinder controls the lifting rod to rise to a high position.

In the second aspect, the present invention further provides a labeling method of the automatic production equipment for label-free packaging bottles, which adopts the technical solutions:

S1, placing a to-be-labeled packaging bottle body on a conveying line, enabling the packaging bottle body to enter a feed track, and buffering speed of the bottle body through a curved buffer channel;

S2, starting the driving mechanism to drive the feed driver plate to rotate, sequentially and continuously conveying the packaging bottle to storage plates that are on a driving annular plate through the feed driver plate and an inlet guide notch, pressing down pressing assemblies, and fixing the bottle body on the storage plates;

S3, when the storage plates move to corresponding positions of laser heads, the corresponding laser heads perform laser marking on the packaging bottle body to complete labeling of a section of product information; and then at least one self-rotating motor drives the corresponding storage plates to rotate by a certain angle, and at the same time, the driving annular plate rotates to rotate the storage plates to positions of the next adjacent laser heads, and the subsequent laser heads perform secondary supplementary labeling on the packaging bottle body, as such the packaging bottle body sequentially passes through each of the laser heads, and each of the laser heads sequentially labels the packaging bottle body until all product information is labeled;

S4, when the packaging bottle body after labeling passes through the discharge driver plate, the discharge driver plate removes the packaging bottle body away from the storage plates before entering a discharge track through an outlet guide notch to complete the discharge.

Alternatively, in Step S3, a labeling method of horizontal division labeling or vertical division labeling is selected according to the range size of the labeling content to be divided. After completing the module division of the labeling content, the divided content is sequentially input into the corresponding laser heads, and each of the laser heads sequentially completes the labeling operation according to the input information.

In summary, the present invention includes at least one of the following beneficial technical effects:

1. By arrangement of the plurality of laser heads distributed in a fan ring, the printing content of the bottle bodies is divided into multiple printing modules, and each of the printing modules is assigned to each of the laser heads. When the packaging bottle bodies move to the position of each of the laser heads, each of the laser heads completes its own printing task, and when the arc printing positions of the bottle bodies of the packaging bottle require to be changed, the at least one self-rotating motor can drive the placement plate to rotate to complete the deflection of the arc printing positions on the side walls of the bottle bodies. The plurality of laser heads are utilized to sequentially and continuously laser label the bottle bodies through the division of the printing range to achieve large-breadth and high-capacity labeling operations for label-free packaging bottles, which is conducive to the mass production of the label-free packaging bottles.
2. The transmission gear ring is arranged by engaging with the driving gear, the first transmission gear and the second transmission gear simultaneously, when the driving motor rotates, the driving gear is driven to rotate, the rotation of the driving gear drives the transmission gear ring to rotate, the transmission gear ring rotation drives the rotating shaft to rotate, which achieves the purpose of driving the driving annular plate to rotate; meanwhile, the driving gear rotation drives the transmission gear ring to rotate, the transmission gear ring rotation drives the first transmission gear and the second transmission gear to rotate, which achieves the purpose of driving the feed driver plate and the discharge driver plate to rotate. By taking a driving motor as the driving source for driving the rotating shaft, the feed driver plate and the discharge driver plate to rotate, the required number of motors can be reduced, which is conducive to reducing energy consumption and performing synchronous control of the feeding and discharging of the packaging bottle bodies on the driving annular plate.

3. By arrangement of the material distribution driver plate, the material detection sensor, the lifting rod and the limit synapses, the number of the bottle bodies between the material distribution driver plate and the material detection sensor is kept at a certain value, which is the safe material level value of passing through the curved buffer channel. When the number of bottle bodies behind the target bottle body is less than the safe material level value, the material distribution driver plate blocks the target bottle body from passing through, which can reduce the possibility of the bottle bodies behind the target bottle body tipping over when passing through the curved buffer channel. The blocked target bottle body and the bottle bodies behind are hold for the next batch of production and are labeled together with the next batch of bottle bodies, which ensures the stability of the bottle bodies when passing through the curved buffer channel and ensures smooth feeding of the bottle bodies.

Figure 1:
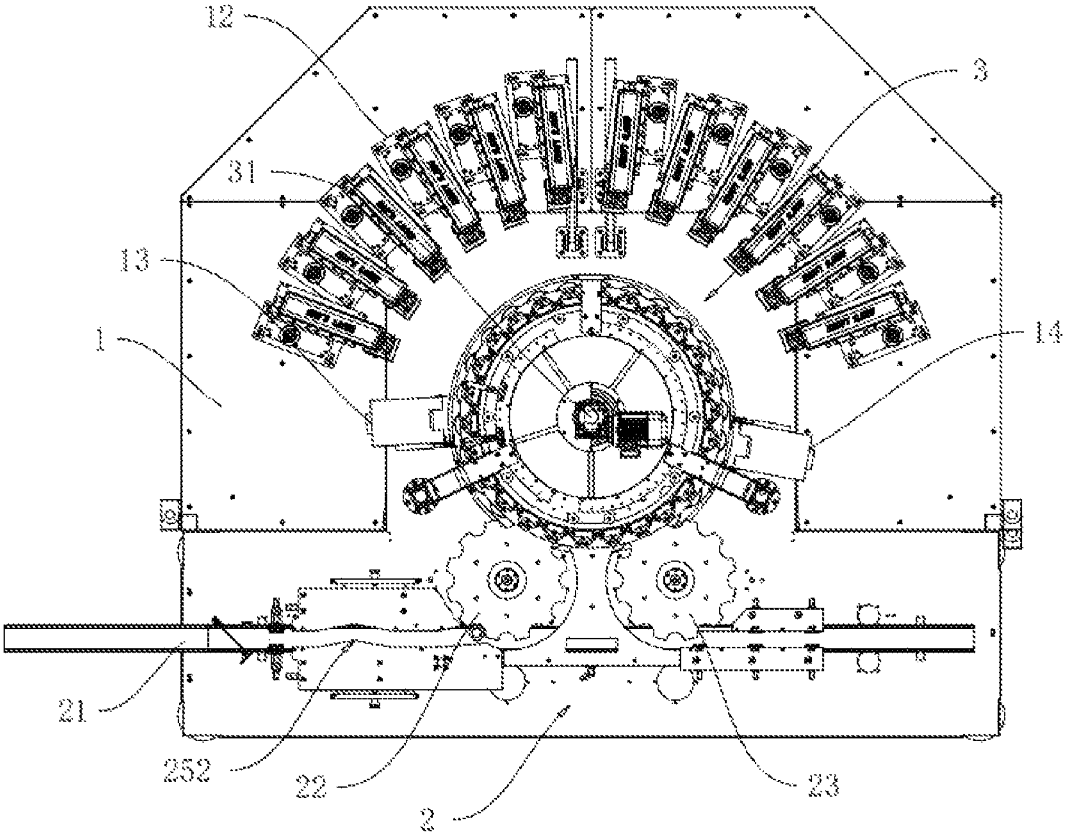
FIG. 1 is an overall structural diagram of an automatic production equipment for label-free packaging bottles in an embodiment of the present invention.

In the drawings: 1—machine frame; 11—driving mechanism; 111—driving motor; 112—driving gear; 12—laser head; 13—feeding camera; 14—discharging camera; 2—bottle body conveying device; 21—conveying line; 211—detection frame; 2111—material detection sensor; 22—feed driver plate; 221—first transmission gear; 23—discharge driver plate; 231—second transmission gear; 24—guide plate; 241—inlet guide notch; 242—outlet guide notch; 25—feed track; 251—feed frame; 252—curved buffer channel; 26—discharge track; 27—material distribution driver plate; 271—material distribution clamping groove; 272—limit synapse; 2721—guide spherical surface; 2722—fixed portion; 2723—movable portion; 2724—buffer spring; 28—control cylinder; 281—lifting rod; 2811—guide conical surface; 3—bottle body labeling device; 31—rotating shaft; 311—transmission gear ring; 32—driving annular plate; 321—storage plate; 322—self-rotating motor; 33—servo annular plate; 34—pressing assembly; 341—pressing driving source; 342—pressing rod; 343—pressing sleeve; and 3431—tapered guide groove.

EMBODIMENTS

Hereinafter, the present application is further described in detail in conjunction with FIGS. 1 to 10.

In the first aspect, embodiments of the present invention disclose an automatic production equipment for label-free packaging bottles.

With reference to FIG. 1, an automatic production equipment for label-free packaging bottles, comprising a machine frame 1, wherein a bottle body conveying device 2 and a bottle body labeling device 3 are arranged on the machine frame 1, the bottle body labeling device 3 is configured to label the packaging bottle bodies, the bottle body conveying device 2 is arranged on one side of the bottle body labeling device 3 and is in transmission connection with the bottle body labeling device 3, configured to feed and discharge for the packaging bottle bodies.

Figure 2:
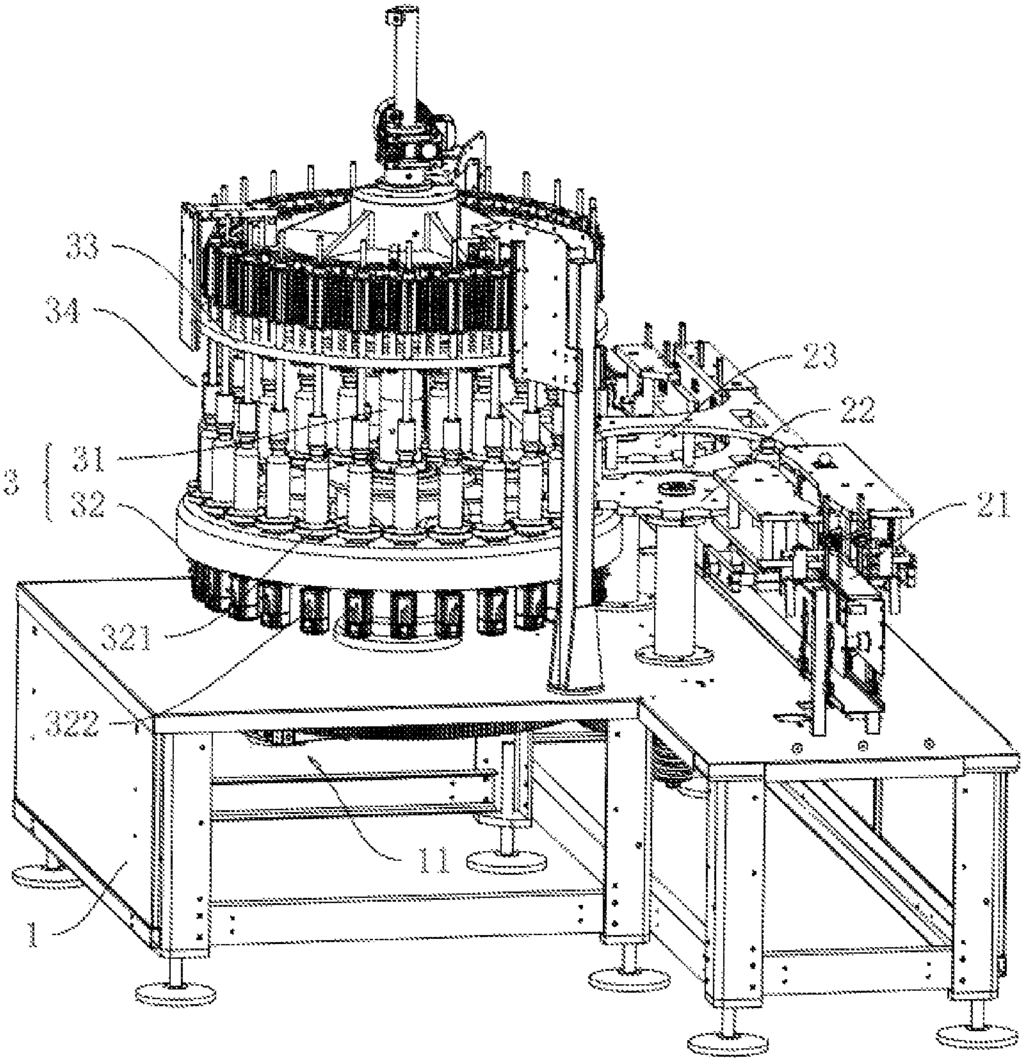
FIG. 2 is a structural diagram of a bottle body labeling device in the embodiment of the present invention.

With reference to FIGS. 1 and 2, the bottle body labeling device 3 comprises a rotating shaft 31 and an driving annular plate 32, the rotating shaft 31 is rotatably connected with the machine frame 1, the driving annular plate 32 is coaxially fixedly connected with the rotating shaft 31 through spokes, a driving mechanism 11 for driving the rotating shaft 31 to rotate is arranged on the machine frame 1. A plurality of storage plates 32 are rotatably arranged on a top portion of the driving annular plate 32, the plurality of storage plates 321 are distributed in a circular array along a circumferential direction of the driving annular plate 32, at least one self-rotating motor 322 for driving each of the plurality of storage plates 321 to rotate is arranged at a bottom portion of the driving annular plate 32, a servo annular plate 33 is coaxially fixed on the rotating shaft 31 through the spokes, pressing assemblies 34 corresponding to the storage plates 321 are arranged on the servo annular plate 33, a plurality of laser heads 12 for bottle labeling are arranged on the machine frame 1, and the plurality of laser heads 12 are distributed in a fan ring shape on one side of the driving annular plate 32 away from the bottle body conveying device 2. In the present embodiment, 12 laser heads 12 are provided, and the number of the laser heads can be adaptively increased or decreased according to the practical label content.

When labeling the bottle bodies, the bottle body conveying device 2 is sequentially utilized to convey the bottle body to the driving annular plate 32. At the same time, the driving mechanism 11 drives the driving annular plate 32 to rotate, so as to drive the storage plates 321 to revolve around the rotating shaft 31, as such each of the storage plates 321 sequentially receives the conveyed bottle bodies. When the bottle bodies arrive at the corresponding storage plates, the corresponding pressing assemblies presses down to load the bottle bodies on the storage plates. During the rotation of the driving annular plate therewith, the bottle bodies sequentially rotate to the front of the plurality of laser heads 12, and the product information content to be labeled on the bottle bodies is pre-divided into multiple printing modules, and the divided printing modules are allocated to the corresponding laser heads 12 according to the printing order. When the bottle bodies move to each of the laser heads 12, each of the laser heads 12 completes its own printing task, and when the arc printing positions on the bottle bodies require to be changed, the storage plates 321 can be driven by the at least one self-rotating motor 322 to rotate to complete the deflection of the arc printing positions on the side walls of the bottle bodies. When all the bottle bodies are labeled, the bottle bodies are sequentially conveyed out of the driving annular plate 32 by the bottle body conveying device 2 to complete the discharge.

In addition, since each of the storage plates 321 is independent of each other, rotating or not is controlled by the at least one self-rotating motor 322 connected to each of them, when conducting labeling operations, the adjacent laser heads 12 can label the contents of adjacent areas, and can also achieve cross-area labeling. The horizontal span is determined by a rotation angle of the corresponding at least one self-rotating motor 322.

With reference to FIG. 1, a feeding camera 13 and a discharging camera 14 are arranged on the machine frame 1, and the feeding camera 13 and the discharging camera 14 are respectively arranged on both sides of the fan-shaped area formed by the plurality laser heads 12, wherein the feeding camera 13 is configured to take pictures of the bottle bodies to identify their positions on the storage plates 321. When the bottle bodies area in non-cylindrical structure (such as a rectangular structure or other special-shaped structure) or the bottle body surface has a texture, it is convenient for the at least one self-rotating motor 322 to adjust the angles of the storage plates 321, so that the bottle bodies on the storage plates 321 are first positioned before labeling, so as to avoid the edges or patterns of the bottle bodies, which is conducive for the first laser head 12 to determine the positions of the bottle bodies for labeling, and further ensures the labeling accuracy of the bottle bodies; the discharging camera 14 is configured for detecting labeling on the bottle bodies, when detecting labeling on the bottle bodies, the corresponding at least one self-rotating motor 322 drives the corresponding storage plates 321 to rotate circumferentially, so that the discharging camera 14 can conduct a comprehensive detection on the entire circumferences of the packaging bottle bodies, and at the same time conduct photo comparison or AI recognition, if unqualified products are detected, they will be rejected in the subsequent rejection process.

Figure 3:
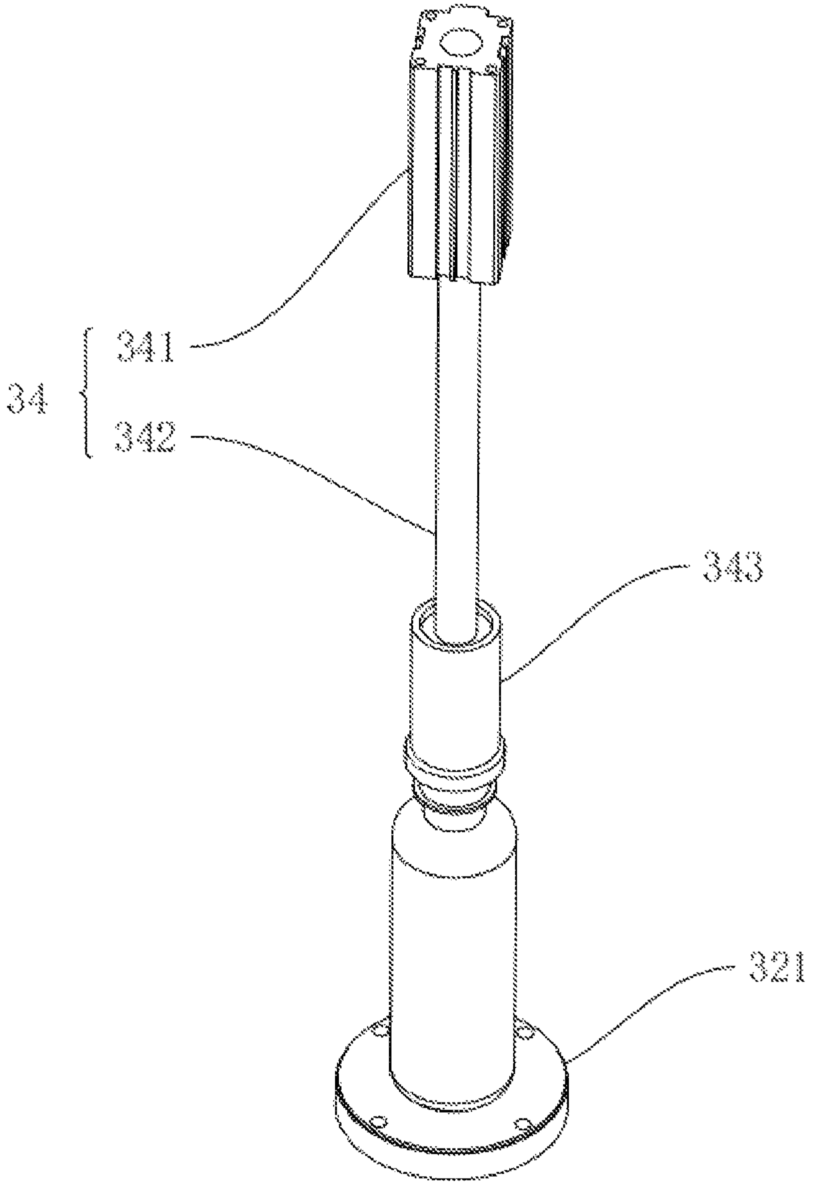
FIG. 3 is a structural diagram of a pressing assembly in the embodiment of the present invention.
Figure 4:
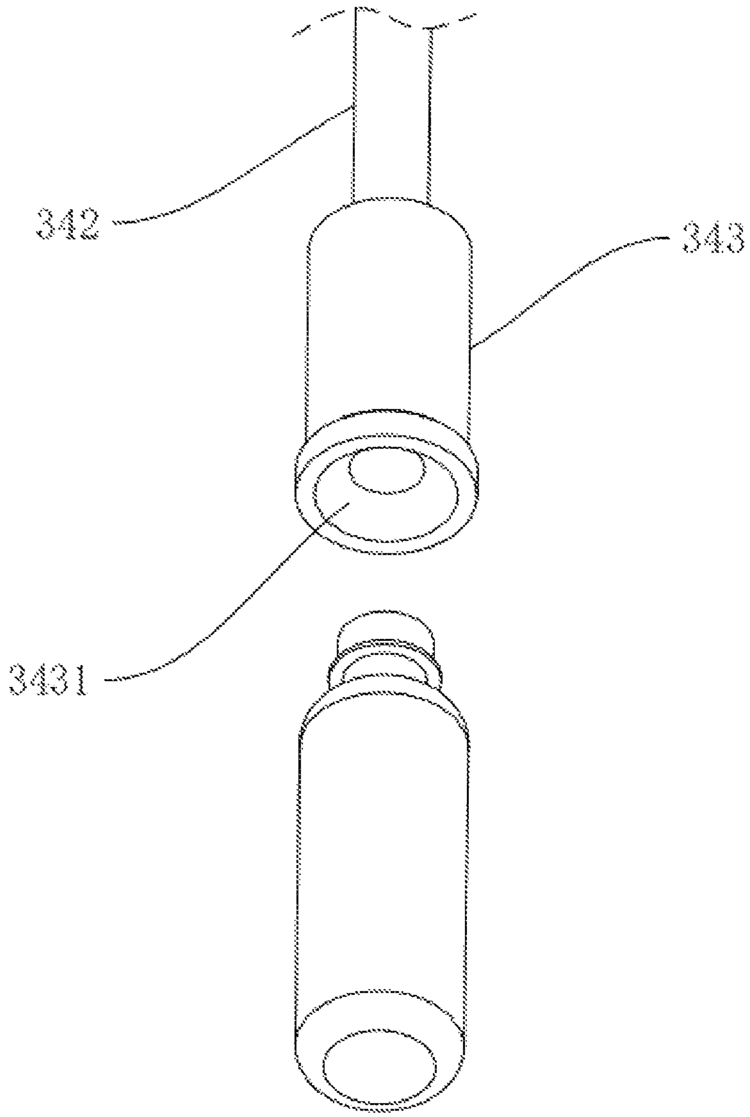
FIG. 4 is a structural diagram of a tapered guide groove in the embodiment of the present invention.

With reference to FIGS. 2, 3 and 4, each of the pressing assemblies 34 comprises a pressing driving source 341 fixed on the servo annular plate 33 and a pressing rod 342 coaxially fixed with an output terminal of the pressing driving source 341, a pressing sleeve 343 is rotatably connected with a lower end of the pressing rod 342, a tapered guide groove 3431 is arranged on a bottom end of the pressing sleeve 343, a radius of an opening end of the tapered guide groove 3431 is greater than a radius of an opening of the packaging bottle. When the bottle bodies of the packaging bottles are conveyed to the storage plates 321 by the bottle body conveying device 2, the corresponding pressing driving source 341 drives the pressing rod 342 to move downward until the pressing sleeve 343 abuts against the opening of the packaging bottle, and the packaging bottle body is clamped and fixed on the storage plate 321. By arranging the tapered guide groove 3431, the packaging bottle bodies can be centered arranged, which reduces the possibility of the landing positions of the packaging bottle bodies on the storage plates 321 being off-center, and improves the accuracy of labeling operation of the laser heads 12. In the present embodiment, the pressing driving source 341 can be one of a pneumatic cylinder, a hydraulic cylinder or an electric cylinder.

Figure 5:
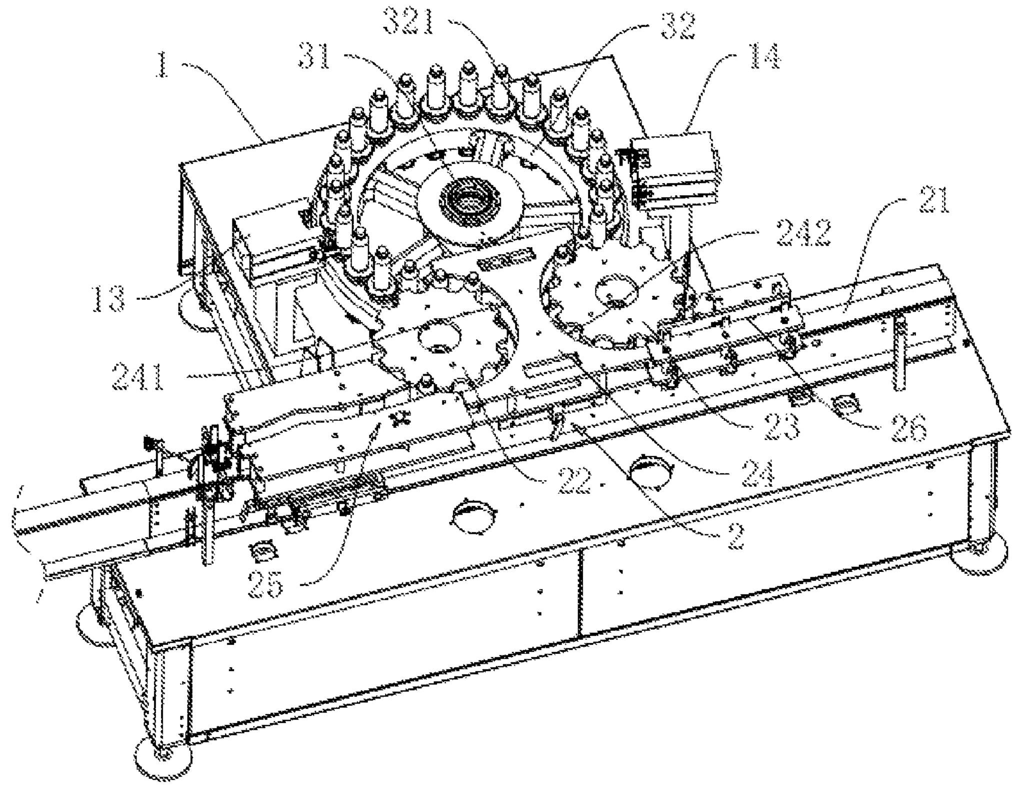
FIG. 5 is a structural diagram of a bottle body conveying device in the embodiment of the present invention.

With reference to FIGS. 2 and 5, the bottle body conveying device 2 comprises a conveying line 21, a feed driver plate 22 and a discharge driver plate 23 that are arranged on the machine frame 1, the feed driver plate 22 is rotatably connected with the machine frame 1, the discharge driver plate 23 is rotatably connected with the machine frame 1, the feed driver plate 22 and the discharge driver plate 23 are arranged between the conveying line 21 and the driving annular plate 32, the driving mechanism 11 is in transmission connection with the feed driver plate 22 and the discharge driver plate 23. A guide plate 24 is arranged above the conveying line 21 and the driving annular plate 32, the guide plate 24 is arranged between the feed driver plate 22 and the discharge driver plate 23, an inlet guide notch 241 coaxially arranged with the feed driver plate 22 is arranged on one side of the guide plate 24, an outlet guide notch 242 coaxially arranged with the discharge driver plate 23 is arranged on the other side thereof, a feed track 25 and a discharge track 26 are respectively arranged on both sides of the guide plate 24 on the conveying line 21, the feed track 25 is connected with the inlet guide notch 241, and the discharge track 26 is connected with the outlet guide notch 242.

Since the conveying line 21 has a conveying function, the packaging bottle bodies first enter the feed track 25 through the conveying line 21, and at the same time, the driving mechanism 11 drives the feed driver plate 22 to rotate, so that the packaging bottle bodies on an output terminal of the feed track 25 can be sequentially transferred to the storage plates 321 of the driving annular plate 32 through the feed driver plate 22 and the inlet guide notch 241 on the guide plate 24; after completing labeling all content, the packaging bottle bodies move towards the discharge driver plate 23, and the driving mechanism 11 drives the discharge driver plate 23 to rotate at the same time. Through the feed driver plate 22 and the outlet guide notch 24 on the guide plate 24, the packaging bottle bodies on the driving annular plate 22 can be sequentially transferred to the discharge track 26 to achieve sequential discharge. The feeding and discharging of the packaging bottle bodies share one conveying line 21, which reduces energy consumption while reducing maintenance costs at the same time. The feed driver plate 22, the discharge driver plate 23 and the guide plate 33 together play the role of a bridge between the conveying line 21 and the driving annular plate 32, which is conducive to the automatic feeding and discharging of the packaging bottle bodies on the annular running track of the driving annular plate 32.

Figure 6:
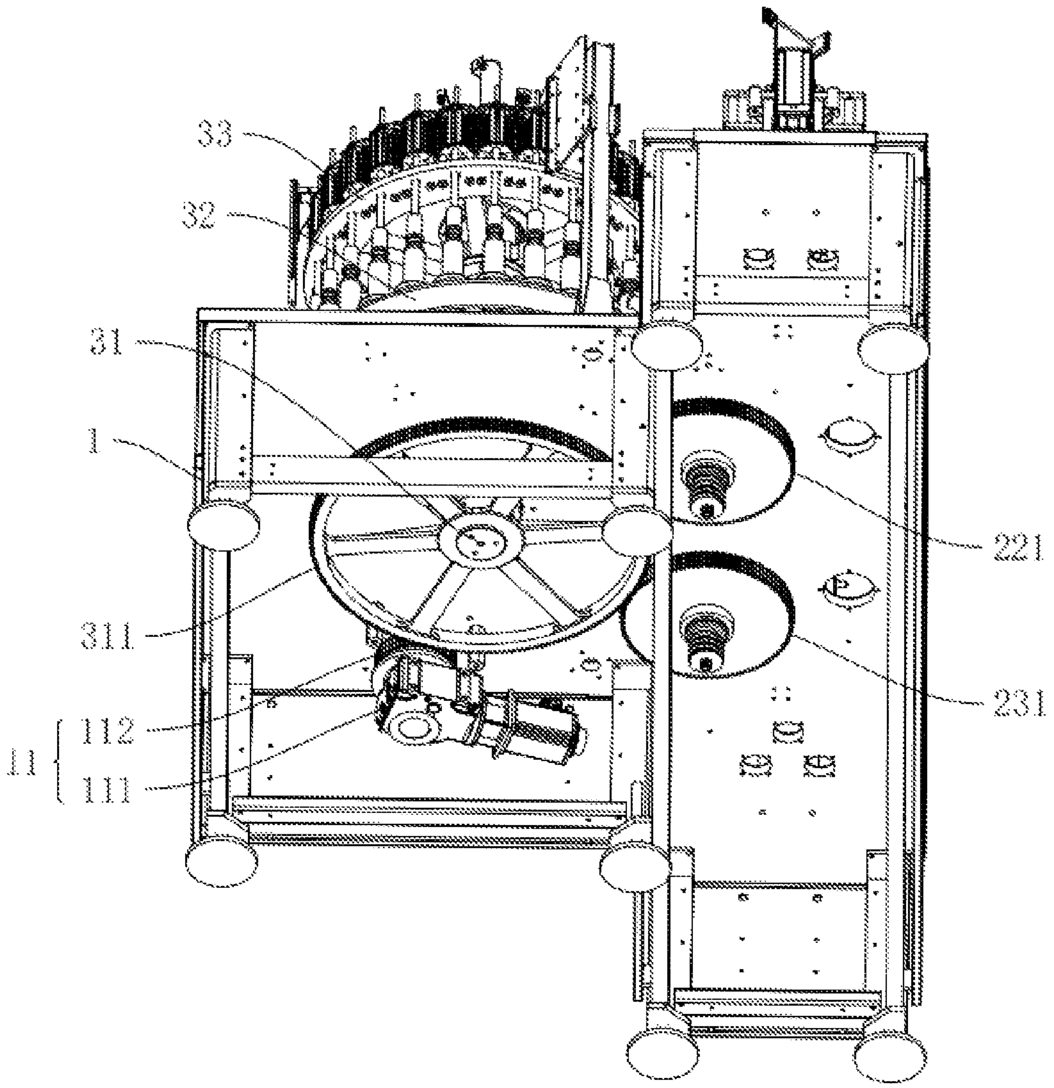
FIG. 6 is a structural diagram of a driving mechanism in the embodiment of the present invention.

With reference to FIGS. 2, 5 and 6, the driving mechanism 11 comprises a driving motor 111 arranged on the machine frame 1 and a driving gear 112 arranged on an output terminal of the driving motor 111, a transmission gear ring 311 is coaxially fixed on the rotating shaft 31, a first transmission gear 221 is coaxially fixed on a lower side of the feed driver plate 22, and a second transmission gear 231 is coaxially fixed on a lower side of the discharge driver plate 23, and the transmission gear ring 311 is arranged to engage with the driving gear 112, the first transmission gear 221 and the second transmission gear 231.

When the driving motor 111 rotates, it drives the driving gear 112 to rotate, the driving gear 112 rotates to drive the transmission gear ring 311 to rotate, and the transmission gear ring 311 rotates to drive the rotating shaft 31 to rotate, so as to achieve the purpose of driving the driving annular plate 32 to rotate; at the same time, the driving gear 112 rotates to drive the transmission gear ring 311 to rotate, and the transmission gear ring 311 rotates to drive the first transmission gear 221 and the second transmission gear 231 to rotate, so as to achieve the purpose of driving the feed driver plate 22 and the discharge driver plate 23 to rotate. By utilizing a driving motor 111 as the driving source for driving the rotating shaft 31, the feed driver plate 22 and the discharge driver plate 23 to rotate, the number of motors utilized can be reduced, which is conducive to reducing energy consumption and performing synchronous control of the feeding and discharging of the packaging bottle bodies on the driving annular plate 32.

During the labeling process, the driving motor 111 works continuously, the feed driver plate 22, the driving annular plate and the discharge driver plate 23 are always in operation, and the storage plates 321 on the driving annular plate 32 revolve around the rotating shaft 31 without stopping during the labeling process. The laser heads 12 can deflect the emitted laser beam at a certain angle through built-in laser deflectors thereof, and can correct the movement of the laser labeling position by adjusting the beam position, so that while the driving annular plate 32 rotates continuously, the corresponding laser heads 12 can synchronously label the packaging bottle bodies, and the adjacent laser heads 12 can achieve seamless connection of the labeling operation, which ensures the continuity of labeling the packaging bottle bodies by each of the laser heads 12, and is conducive to improving the labeling efficiency on the bottle bodies and meeting the production requirements of high production capacity.

Figure 7:
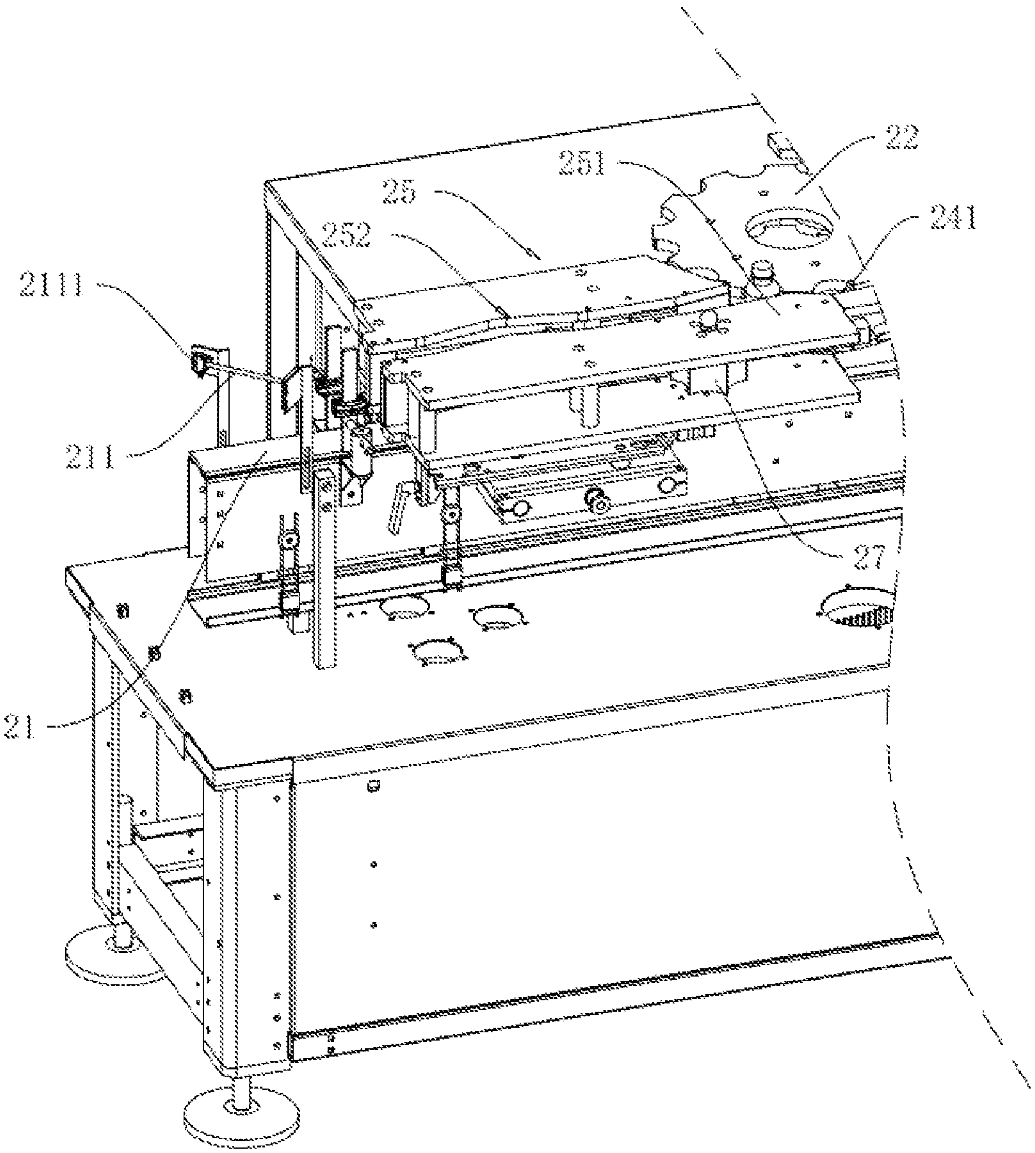
FIG. 7 is a structural diagram of a feed track in the embodiment of the present invention.

With reference to FIG. 7, the feed track 25 comprises feed frames 251 arranged on both sides above the conveying line 21, a curved buffer channel 252 adapted to an outer diameter of the bottle body is formed between the two feed frames 251, and the curved buffer channel 252 smoothly transitions with the inlet guide notch 241. When the packaging bottle bodies are conveyed between the two feed frames 251, the feeding speed of the packaging bottle bodies is buffered and slowed down through the curved buffer channel 252, which can reduce the collision impact generated when the packaging bottles touch the feed driver plate 22, and reduce the possibility of damage or pitting of the packaging bottle bodies. In addition, it can reduce the situation where two or more bottle bodies simultaneously break into one of the dial grooves during the rotation of the feed driver plate 22 due to the excessively fast bottle feeding speed, and then the multiple bottle bodies that enter are forcibly squeezed and damaged by the rotation of the feed driver plate 22, which reduces the possibility of bottle jamming, blockage, etc.

Figure 8:
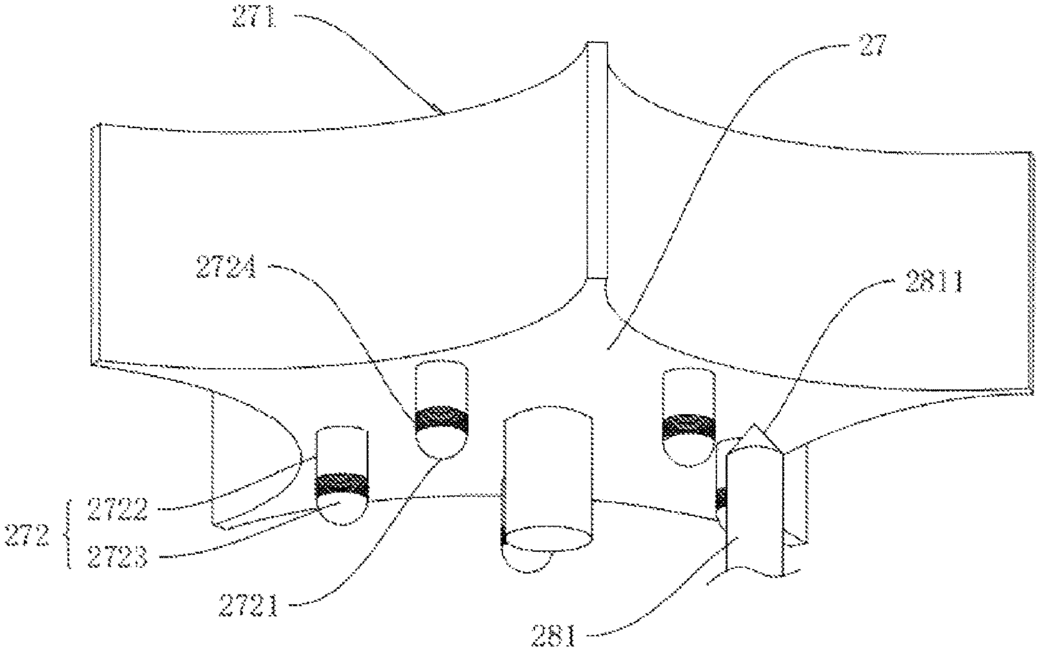
FIG. 8 is a structural diagram of the structure of a material distribution driver plate and limit synapses in the embodiment of the present invention.

With reference to FIGS. 7 to 8, a material distribution driver plate 27 is rotatably connected with the one of the feed frames 251 on one side, a plurality of material distribution clamping grooves 271 each arranged to permit passage for only a single bottle body to pass through are evenly arranged on an outer peripheral surface of the material distribution driver plate 27, and a distance from an outermost end of each of the material distribution clamping grooves 271 to a rotation center of the material distribution driver plate 27 is greater than a shortest distance from the rotation center of the material distribution driver plate 27 to the curved buffer channel 252. In this way, the bottle bodies passing through the curved buffer channel 252 can be separated one by one by the material distribution clamping grooves 271 of the bottle separation driver plate first, so that adjacent bottle bodies maintain a certain distance, and then the bottle bodies are fed to the feed driver plate 22 driven by the conveying line 21, which reduces the situation that one of the dial grooves on the feed driver plate 22 enters two or more bottle bodies at the same time, which further reduces the possibility of bottle jamming.

Figure 9:
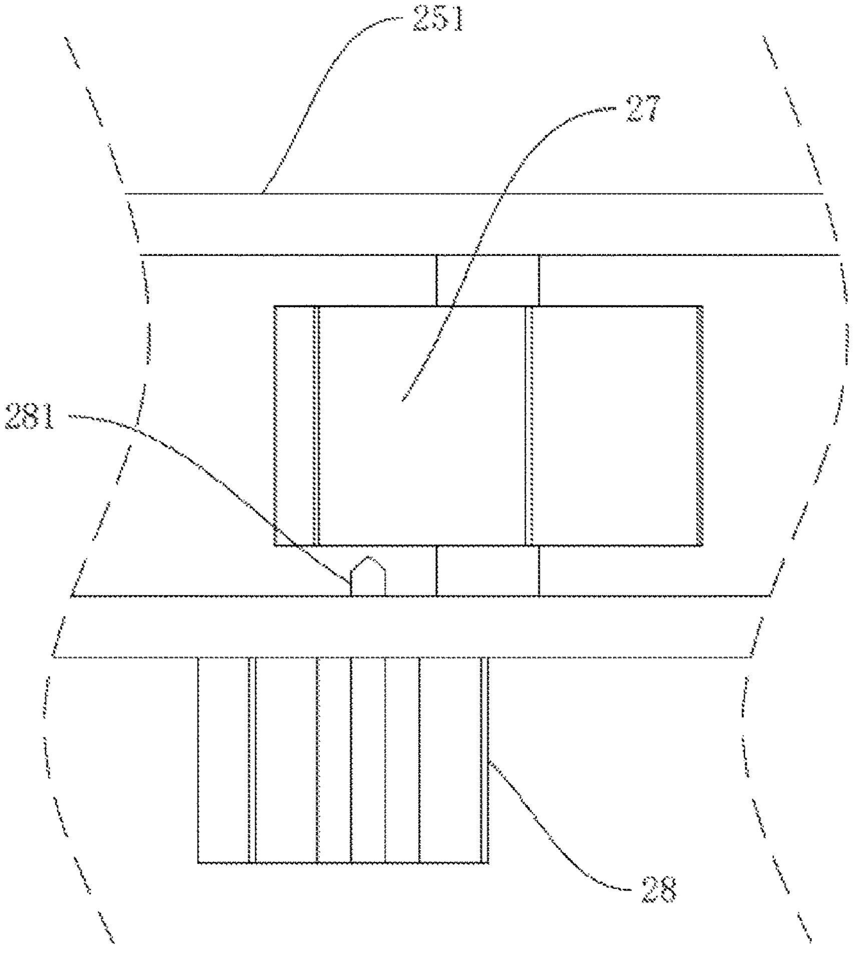
FIG. 9 is a structural diagram showing a position relationship between a control cylinder and the material distribution driver plate in the embodiment of the present invention.

With reference to FIGS. 7, 8 and 9, a detection frame 211 is arranged on the conveying line 21, the detection frame 211 is arranged on one side of a feeding end of one of the feed frames 251, a material detection sensor 2111 for detecting whether there is a bottle body passing below is arranged on the detection frame 211, a control cylinder 28 is arranged below the material distribution driver plate 27, the control cylinder 28 is arranged on the corresponding one of the feed frames 251 on the same side, and the control cylinder 28 is electrically connected with the material detection sensor 2111. A lifting rod 281 is arranged on an output terminal of the control cylinder 28, a plurality of limit synapses 272 are arranged on a lower end of the material distribution driver plate 27, the plurality of limit synapses 272 are distributed in a circular array along a rotation center of the material distribution driver plate 27, and the lifting rod 281 is arranged on a circular track surrounded by the plurality of limit synapses 272.

When the bottle bodies pass through the curved buffer channel 252, the centrifugal force on the bottle bodies changes during the movement, which causes the combined force of the own gravity and the centrifugal force of the bottle bodies to change during the movement, which further causes the bottle bodies to shake greatly in the curved buffer channel 252. Especially when the bottle bodies pass through an inflection point of the curved buffer channel 252, the change in the centrifugal force of the bottle bodies is the largest, that the bottle bodies are prone to tipping over under the sudden change of centrifugal force. When the bottle bodies are fed from the conveying line 21, the adjacent bottle bodies are closely adjacent, and the adjacent bottle bodies can support each other during the movement, which can reduce the amplitude of the bottle shaking. In the initial stage of feeding, the lifting rod 281 is in a low position, the conveying line 21 is started, and the initial speed of the conveying line 21 is low, that the bottle bodies are not easy to tip over when passing through the curved buffer channel 252. After a short period of feeding, the speed of the conveying line 21 gradually reaches a rated speed, and the material detection sensor 2111 detects whether there are bottle bodies passing below, and when the material detection sensor 2111 detects that the bottle bodies pass below, the control cylinder 28 controls the lifting rod 281 to always remain in a low position, and when the material detection sensor 2111 detects that no bottle body passes below, it sends an electrical signal. After receiving the electrical signal, the control cylinder 28 controls the lifting rod 281 to rise to a high position, and at this time, the lifting rod 281 interferes with the circular motion of the limit synapses 272, which limits the rotation of the material distribution driver plate 27, and further prevents the bottle bodies from passing through the discharge ends of the feed frames 251. In this way, the number of the detected bottle bodies between the material distribution driver plate 27 and the material detection sensor 2111 can be maintained at a certain value, which is a safe material level value for passing through the curved buffer channel 252. When the number of bottle bodies behind the target bottle body is less than the safe material level value, the material distribution driver plate 27 blocks the target bottle body from passing through, which can reduce the possibility of the bottle bodies behind the target bottle body tipping over when passing through the curved buffer channel 252. The blocked target bottle body and the bottle bodies behind are hold for the next batch of production and are labeled together with the next batch of bottle bodies, which ensures the stability of the bottle bodies when passing through the curved buffer channel 252 and ensures smooth feeding of the bottle bodies.

With reference to FIG. 8, a guide spherical surface 2721 is arranged on a bottom end of each of the limit synapses 272, and guide conical surface 2811 is arranged on a top end of the lifting rod 281. Since the positions of the limit synapses are difficult to determine when the lifting rod moves upward, there is a possibility that the lifting rod will collide with one of the limit synapses. By arranging the guide spherical surface 2721 and the guide conical surface 2811, when the lifting rod 281 is rising, the guide spherical surface 2721 contacts the guide conical surface 2811, and the guide effect of the guide conical surface 2811 forces the limit synapses 272 to deflect to one side of the lifting rod 281, which reduces the collision and extrusion between the lifting rod 281 and the limit synapses 272 when the control cylinder 28 controls the lifting rod 281 to rise to a high position, and reduces the possibility of breakdown of the material distribution driver plate 27.

With reference to FIG. 8, each of the limit synapses 272 comprises a fixed portion 2722 and a movable portion 2723 that are arranged from top to bottom, the fixed portion 2722 is fixed to a bottom surface of a material distribution driver plate 27, the guide spherical surface 2721 is arranged at a bottom end of the movable portion 2723, and a buffer spring 2724 is connected between the movable portion 2723 and the fixed portion 2722. By arranging the above structure, the problem that the limit synapses 272 cannot automatically avoid the lifting rod 281 by means of the guiding effect of the guide conical surface 2811 and the guide spherical surface 2721 when the cone top of the guide conical surface 2811 and the lowest point of the guide spherical surface 2721 are in direct contact during the lifting rod 281 rising process can be solved. When the above problem occurs, through arrangement of the movable portion 2723 and the buffer spring 2724, when the cone top of the guide conical surface 2811 and the lowest point of the guide spherical surface 2721 are in direct contact, the buffer spring 2724 is compressed, which can buffer the collision of the lifting rod 281, and at the same time, since the rotation of the material distribution driver plate 27 is not limited, the bottle bodies will still drive the material distribution driver plate 27 to deflect a certain angle when passing through the material distribution driver plate. During the deflection of the material distribution driver plate 27, the fixed portion 2722 deflects accordingly, and the buffer spring 2724 is twisted to separate the movable portion 2723 from the lifting rod 281 and realize the automatic reset of the movable portion 2723, which realizes the automatic avoidance of the limit synapses 272 to the lifting rod 281, and further reduces the possibility of collision and extrusion between the lifting rod 281 and the limit synapses 272 when the control cylinder 28 controls the lifting rod 281 to rise to a high position.

Figure 10:
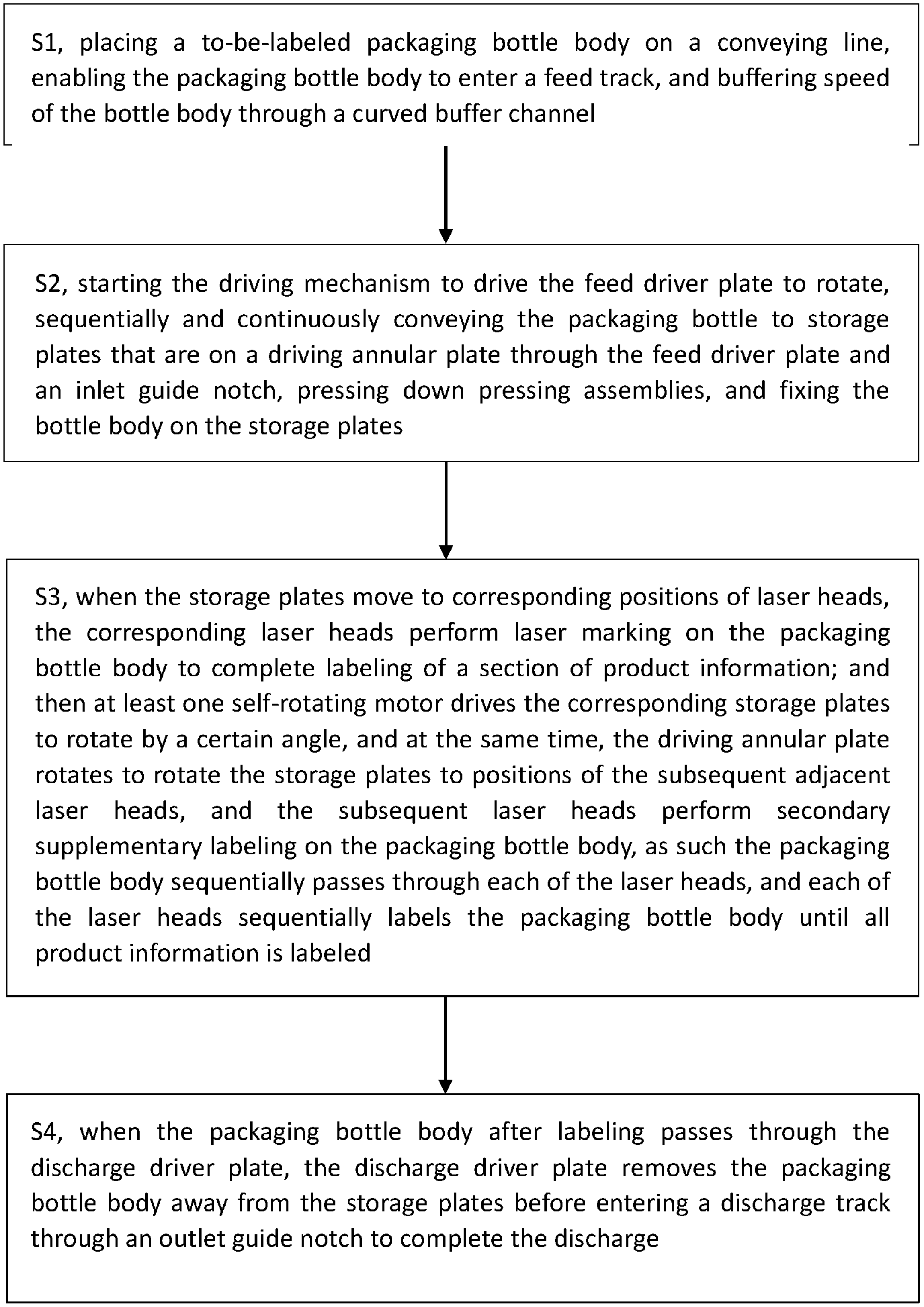
FIG. 10 is a flow chart showing a labeling method of the automatic production equipment for label-free packaging bottles in the embodiment of the present invention.

In the second aspect, the embodiments of the present invention further disclose a labeling method of the automatic production equipment for label-free packaging bottles, which adopts the technical solutions:

With reference to FIG. 10, the embodiments of the present invention further disclose a labeling method of the automatic production equipment for label-free packaging bottles, comprising the following steps:

S1, placing a to-be-labeled packaging bottle body on a conveying line 21, enabling the packaging bottle body to enter a feed track 25, and buffering speed of the bottle body through a curved buffer channel 252;

S2, starting the driving mechanism 11 to drive the feed driver plate 22 to rotate, sequentially and continuously conveying the packaging bottle to storage plates 321 that are on a driving annular plate 32 through the feed driver plate 22 and an inlet guide notch 241, pressing down pressing assemblies 34, and fixing the bottle body on the storage plates 321;

S3, when the storage plates 321 move to corresponding positions of laser heads 12, the corresponding laser heads 12 perform laser marking on the packaging bottle body to complete labeling of a section of product information; and then at least one self-rotating motor 322 drives the corresponding storage plates 321 to rotate by a certain angle, and at the same time, the driving annular plate 32 rotates to rotate the storage plates 321 to positions of the next adjacent laser heads 12, and the subsequent laser heads 12 perform secondary supplementary labeling on the packaging bottle body, as such the packaging bottle body sequentially passes through each of the laser heads 12, and each of the laser heads 12 sequentially labels the packaging bottle body until all product information is labeled;

S4, when the packaging bottle body after labeling passes through the discharge driver plate 23, the discharge driver plate 23 removes the packaging bottle body away from the storage plates 321 before entering a discharge track 26 through an outlet guide notch 242 to complete the discharge.

It is worth noting that in step S3, after all the laser heads 12 complete the labeling operation, the final labeling information on the bottle bodies shall be detected to ensure the labeling quality of the bottle bodies;

Secondly, when the bottle body is in a non-cylindrical structure or the bottle body surface has a texture, the bottle body should be positioned and adjusted before marking, which is conducive for the first laser head 12 to determine the positions of the bottle bodies for labeling, so that the marking position avoids the edges or patterns of the bottle bodies, which further ensures the labeling accuracy of the bottle bodies.

In Step S3, a labeling method of horizontal division labeling or vertical division labeling is selected according to the range size of the labeling content to be divided. After completing the module division of the labeling content, the divided content is sequentially input into the corresponding laser heads 12, and each of the laser heads 12 sequentially completes the labeling operation according to the input information. Wherein, the labeling content to be labeled includes but is not limited to a combination of one or more of numbers, characters, LOGO, name, QR code, barcode, DM code, information logo and the like. The divided labels can be spliced into a complete product information logo on the packaging bottle body after being labeled by the plurality of laser heads 12. In the present embodiment, the labeling content adopts a horizontal division labeling cooperation mode and a vertical division labeling cooperation mode.

In the aforementioned bottle making method, the plurality of laser heads 12 are adopted to sequentially and continuously laser mark the bottle bodies by dividing the printing range, which can realize large-format and high-capacity labeling of label-free packaging bottles, which is conducive to the mass production of label-free packaging bottles. At the same time, the number of the laser heads can be adaptively increased or decreased according to the practical labeling content.

The above are all preferred embodiments of the present invention, and the protection scope of the present invention is not limited thereto. Therefore, all equivalent changes made according to the structure, shape, and principle of the present invention shall fall within the protection scope of the present invention.

The invention claimed is:

1. An automatic production equipment for label-free packaging bottles, comprising a machine frame (1), wherein a bottle body conveying device (2) and a bottle body labeling device (3) are arranged on the machine frame (1), wherein the bottle body conveying device (2) is arranged on one side of the bottle body labeling device (3) and is in transmission connection with the bottle body labeling device (3); and the bottle body labeling device (3) comprises a rotating shaft (31) arranged on the machine frame (1) and an driving annular plate (32) coaxially fixed on the rotating shaft (31), a driving mechanism (11) for driving the rotating shaft (31) to rotate is arranged on the machine frame (1), a plurality of storage plates (32) are rotatably arranged on a top portion of the driving annular plate (32), the plurality of storage plates (321) are distributed in a circular array along a circumferential direction of the driving annular plate (32), at least one self-rotating motor (322) for driving the respective storage plates (321) to rotate is arranged at a bottom portion of the driving annular plate (32), a servo annular plate (33) is coaxially fixed on the rotating shaft (31), pressing assemblies (34) corresponding to the storage plates (321) are arranged on the servo annular plate (33), a plurality of laser heads (12) for bottle labeling are arranged on the machine frame (1), and the plurality of laser heads (12) are distributed in a fan ring shape on one side of the driving annular plate (32) away from the bottle body conveying device (2);

- the bottle body conveying device (2) comprises a conveying line (21), a feed driver plate (22) and a discharge driver plate (23) that are arranged on the machine frame (1), the feed driver plate (22) and the discharge driver plate (23) are respectively rotatably connected with the machine frame (1) are arranged between the conveying line (21) and the driving annular plate (32), the driving mechanism (11) is in transmission connection with the feed driver plate (22) and the discharge driver plate (23), a guide plate (24) is arranged above the conveying line (21) and the driving annular plate (32), the guide plate (24) is arranged between the feed driver plate (22) and the discharge driver plate (23), an inlet guide notch (241) coaxially arranged with the feed driver plate (22) is arranged on one side of the guide plate (24), an outlet guide notch (242) coaxially arranged with the discharge driver plate (23) is arranged on the other side thereof, a feed track (25) and a discharge track (26) are respectively arranged on both sides of the guide plate (24) on the conveying line (21), the feed track (25) is connected with the inlet guide notch (241), and the discharge track (26) is connected with the outlet guide notch (242);
- the feed track (25) comprises feed frames (251) arranged on both sides above the conveying line (21), a curved buffer channel (252) adapted to an outer diameter of the bottle body is formed between the two feed frames (251), and the curved buffer channel (252) smoothly transitions with the inlet guide notch (241);
- a material distribution driver plate (27) is rotatably connected with the one of the feed frames (251) on one side, a plurality of material distribution clamping grooves (271) for only a single bottle body to pass through are evenly arranged on an outer peripheral surface of the material distribution driver plate (27), and a distance from an outermost end of each of the material distribution clamping grooves (271) to a rotation center of the material distribution driver plate (27) is greater than a closest distance from the rotation center of the material distribution driver plate (27) to the curved buffer channel (252); and
- a detection frame (211) is arranged on the conveying line (21), the detection frame (211) is arranged on one side of a feeding end of one of the feed frames (251), a material detection sensor (2111) for detecting whether there is a bottle body passing below is arranged on the detection frame (211), a control cylinder (28) is arranged below the material distribution driver plate (27), the control cylinder (28) is electrically connected with the material detection sensor (2111), a lifting rod (281) is arranged on an output terminal of the control cylinder (28), a plurality of limit synapses (272) are arranged on a lower end of the material distribution driver plate (27), the plurality of limit synapses (272) are distributed in a circular array along a rotation center of the material distribution driver plate (27), and the lifting rod (281) is arranged on a circular track surrounded by the plurality of limit synapses (272).

2. The automatic production equipment for label-free packaging bottles according to claim 1, wherein a guide spherical surface (2721) is arranged on a bottom end of each of the limit synapses (272), and guide conical surface (2811) is arranged on a top end of the lifting rod (281).

3. The automatic production equipment for label-free packaging bottles according to claim 2, wherein each of the limit synapses (272) comprises a fixed portion (2722) and a movable portion (2723) that are arranged from top to bottom, the fixed portion (2722) is fixed to a bottom surface of a material distribution driver plate (27), the guide spherical surface (2721) is arranged at a bottom end of the movable portion (2723), and a buffer spring (2724) is connected between the movable portion (2723) and the fixed portion (2722).

4. The automatic production equipment for label-free packaging bottles according to claim 1, wherein the driving mechanism (11) comprises a driving motor (111) arranged on the machine frame (1) and a driving gear (112) arranged on an output terminal of the driving motor (111), a transmission gear ring (311) is coaxially fixed on the rotating shaft (31), a first transmission gear (221) is coaxially fixed on the feed driver plate (22), and a second transmission gear (231) is coaxially fixed on the discharge driver plate (23), and the transmission gear ring (311) is respectively engaged with the driving gear (112), the first transmission gear (221) and the second transmission gear (231).

5. A labeling method of the automatic production equipment for label-free packaging bottles according to claim 4, comprising the following steps:

- S1, placing the packaging bottle body to be labeled on a conveying line (21), enabling the packaging bottle body to enter a feed track (25), and buffering speed of the bottle body through a curved buffer channel (252);

S2, starting the driving mechanism (11) to drive the feed driver plate (22) to rotate, sequentially and continuously conveying the packaging bottle to storage plates (321) that are on a driving annular plate (32) through the feed driver plate (22) and an inlet guide notch (241), pressing down pressing assemblies (34), and fixing the bottle body on the storage plates (321);

S3, when the storage plates (321) move to corresponding positions of laser heads (12), the corresponding laser heads (12) perform laser marking on the packaging bottle body to complete entry of a section of product information; and then at least one self-rotating motor (322) drives the corresponding storage plates (321) to rotate by a certain angle, and at the same time, the driving annular plate (32) rotates to rotate the storage plates (321) to positions of the next adjacent laser heads (12), and the next laser heads (12) perform secondary supplementary labeling on the packaging bottle body, as such the packaging bottle body sequentially passes through each of the laser heads (12), and each of the laser heads (12) sequentially labels the packaging bottle body until all product information is entered;

S4, when the packaging bottle body after labeling passes through the discharge driver plate (23), the discharge driver plate (23) takes the packaging bottle body away from the storage plates (321), and the packaging bottle body after leaving the storage plates (321) enters a discharge track (26) through an outlet guide notch (242), the discharge is completed.

6. The labeling method of the automatic production equipment for label-free packaging bottles according to claim 5, wherein in step S3, the content to be labeled on the packaging bottle body is divided into modules, the divided label content is sequentially input into the positions of the corresponding laser heads (12), and the laser heads (12) chooses a labeling method of horizontal labeling or vertical labeling according to a size of the divided labeling range.

* * * * *